United States Patent
Riekenbrauck et al.

(10) Patent No.: US 11,542,107 B2
(45) Date of Patent: Jan. 3, 2023

(54) METHOD AND ASSEMBLY FOR TRANSFERRING PRODUCTS

(71) Applicant: Uhlmann Pac-Systeme GmbH & Co. KG, Laupheim (DE)

(72) Inventors: Joerg Riekenbrauck, Schwendi (DE); Wladimir Triller, Holzheim (DE); Sebastian Scharpf, Illerkirchberg (DE)

(73) Assignee: Uhlmann Pac-Systeme GmbH & Co. KG, Laupheim (DE)

( * ) Notice: Subject to any disclaimer, the term of this patent is extended or adjusted under 35 U.S.C. 154(b) by 0 days.

(21) Appl. No.: 17/315,693

(22) Filed: May 10, 2021

(65) Prior Publication Data

US 2021/0354933 A1     Nov. 18, 2021

(30) Foreign Application Priority Data

May 12, 2020   (EP) .................................... 20174055

(51) Int. Cl.
| | |
|---|---|
| *B65G 47/91* | (2006.01) |
| *B25J 9/00* | (2006.01) |
| *B25J 15/06* | (2006.01) |
| *B25J 19/02* | (2006.01) |
| *B65G 47/08* | (2006.01) |

(52) U.S. Cl.
CPC .......... *B65G 47/918* (2013.01); *B25J 9/0093* (2013.01); *B25J 15/065* (2013.01); *B25J 19/023* (2013.01); *B65G 47/082* (2013.01)

(58) Field of Classification Search
CPC .. B65B 57/10; B65B 9/04; B65B 5/10; B65B 35/06; B65B 59/00; B65B 35/38; B65G 47/918; B65G 47/082; B65G 47/28; B25J 9/0093; B25J 15/065; B25J 19/023

USPC ................ 700/259; 294/183, 213; 198/468.4
See application file for complete search history.

(56) References Cited

U.S. PATENT DOCUMENTS

| | | | | |
|---|---|---|---|---|
| 5,863,177 | A | * | 1/1999 | Carson .................... B65B 19/34 |
| | | | | 198/786 |
| 9,073,222 | B2 | * | 7/2015 | Crosby ..................... B65B 5/08 |
| 9,969,565 | B1 | * | 5/2018 | Simm ..................... B65B 35/38 |
| 10,369,701 | B1 | * | 8/2019 | Diankov ................... G06T 7/50 |
| 2010/0305754 | A1 | | 12/2010 | Ban et al. |

(Continued)

FOREIGN PATENT DOCUMENTS

| | | |
|---|---|---|
| EP | 0856465 | 8/1998 |
| EP | 2664553 | 11/2013 |

(Continued)

OTHER PUBLICATIONS

European Search Report dated Nov. 3, 2020.

*Primary Examiner* — James R Bidwell
(74) *Attorney, Agent, or Firm* — Dickinson Wright PLLC

(57) ABSTRACT

A transfer device having a plurality of pick-up heads loads products into receptacles. The products are provided in a random arrangement in a pick-up area, and the position of each product is detected. To pick up the products, the transfer device is moved over the pick-up area and each pick-up head picks up an individual product at a pick-up time and in a pick-up position. The pick-up position and the pick-up time for the products are determined on the basis of the previously detected positions of the products. The placement of the products in a placement area may also occurs while the transfer device is moving relative to the receptacles.

12 Claims, 3 Drawing Sheets

(56) References Cited

U.S. PATENT DOCUMENTS

| | | |
|---|---|---|
| 2012/0085623 A1 | 4/2012 | Wipf |
| 2012/0323357 A1 | 12/2012 | Izumi et al. |
| 2014/0119875 A1* | 5/2014 | Job ................. B65G 47/71 |
| | | 414/800 |
| 2014/0195053 A1 | 7/2014 | Subotincic |

FOREIGN PATENT DOCUMENTS

| | | | |
|---|---|---|---|
| IT | 201600130845 | | 6/2018 |
| JP | 2001239484 | | 9/2001 |
| WO | 2018210404 | * 11/2018 | ............ B25J 9/16 |

* cited by examiner

METHOD AND ASSEMBLY FOR TRANSFERRING PRODUCTS

CROSS-REFERENCE TO RELATED APPLICATIONS

This application claims the benefit of priority under 35 U.S.C. § 119 to European Patent Application No. 20 174 055.2, filed May 12, 2020, the contents of which are incorporated herein by reference in their entirety.

FIELD

The present disclosure relates to a method and an assembly for transferring products by means of a transfer device to fill corresponding receptacles with the products. In particular, the disclosure relates to a method and an assembly for filling blister pockets with tablets.

BACKGROUND

Various methods and devices are known by means of which products provided in the form of bulk goods, especially medicinal and pharmaceutical products, can be loaded into appropriate packages.

A filling station for filling blister pockets with sugar-coated pills or tablets is known, for example, from EP 3 018 058 A1. This filling station comprises a filling-shaft unit with several filling shafts, which extend vertically and through each of which a product falls into a blister pocket.

EP 2 962 944 A1 discloses a method for filling a blister web with tablets, in which the tablets are moved along in a conveying direction to a transfer point, at which the tablets are aligned with pockets of the blister web. The tablets are then pushed over an ejection edge into the pockets of the blister web. To prevent the tablets from tipping over, the ejection edge is moved in the direction opposite to the conveying direction at the time of transfer.

We have found that the known devices and methods, however, suffer from the disadvantage that the individual products must first be presorted or delivered individually by a feed device. This results in an increased amount of work and leads to a more complicated construction of the corresponding filling stations. We have also discovered that these stations, furthermore, are frequently format-dependent, which means that, when there is change in the product or in the format, a corresponding amount of work is created to re-tool the system. In addition, the feed devices, especially in the case of tablets, can become contaminated with dust and fragments, which results in an increase in the amount of required cleaning work.

Finally, in the case of the known methods and devices, all of the products provided are loaded into the corresponding (blister) packs, so that, for the sake of quality assurance, either additional measures must be taken before the pockets are filled, or packages with products of defective quality must be sorted out or destroyed afterwards.

Alternatively, so-called "pick-and-place" methods and devices are used, in which products are usually picked up individually and placed in an appropriate receptacle. It is obvious that a very great deal of effort is required to do this, especially in the context of mass production.

SUMMARY

It is therefore an object of the present disclosure to provide a method and an assembly which make it possible to fill receptacles with corresponding products reliably and efficiently.

According to an aspect of the disclosure, a method for transferring products by means of a transfer device comprising a plurality of pick-up heads, each of which picks up a product, comprises the following steps:

(a) providing a plurality of products in a pick-up area, where the products are randomly arranged in at least one direction;

(b) determining the position of each product of the plurality of products in the pick-up area;

(c) determining, for each pick-up head of the plurality of pick-up heads, a pick-up position where, and a pick-up time when, the individual pick-up head picks up a product, based on the arrangement of the plurality of pick-up heads relative to each other and on the determined position of the products in the pick-up area;

(d) determining a pick-up path of the transfer device along the determined pick-up positions and in accordance with the pick-up times;

(e) moving the transfer device along the pick-up path relative to the plurality of products arranged in the pick-up area;

(f) picking up an individual product by each pick-up head in each of the determined pick-up positions and at each of the determined pick-up times during the movement of the transfer device along the pick-up path;

(g) moving the stocked transfer device to a placement area, in which a plurality of receptacles for the moved products are provided; and (h) placing an individual product into each receptacle by the use of each pick-up head.

In this way a method is provided according to which it is possible to provide the products as randomly arranged bulk goods and nevertheless to fill appropriate receptacles with them efficiently. There is no necessity to sort, align, or separate the products beforehand, as a result of which the method and the corresponding devices for implementing the method according to the disclosure are easy to lay out. Above all, there is no need for any assemblies which could easily become contaminated, as a result of which the amount of cleaning work is reduced. Because the products are picked up by the pick-up heads while the transfer device is moving along the pick-up path, the products can be picked up in the quickest possible manner for the arrangement of products in the pick-up area present at the moment in question. In particular, the arrangement of the plurality of pick-up heads relative to each other has no limiting effect on the method.

The method according to the disclosure is adapted in particular to the transfer of medicinal or pharmaceutical products in the form of solid items such as sugar-coated pills or tablets. The receptacles are in this case preferably formed by the blister pockets of a blister web.

To provide the most efficient possible method, the method preferably comprises the repetition of steps (a)-(h) and possibly additional method steps.

The method can be used when none of the receptacles have previously been filled with a product, i.e., for example, when an empty blister web is standing ready in the placement area, and all of the receptacles are to be filled by the transfer device. The method can also be used, however, for the purpose of post-filling or evening out, when, although some of the receptacles have already been filled with products, certain other receptacles have not yet been filled or won't be filled with a product. This is the case, for example, when a filling step has already been carried out previously, or when defective products must be rejected.

Therefore, the transfer device does not necessarily have to be fully stocked in step (f). On the contrary, it can be only partially stocked, for example, in accordance with the existing requirements. Step (g) then comprises moving of a partially stocked transfer device.

The entire method is preferably carried out entirely automatically. For example, step (b) is carried out by means of a detection unit for detecting the position of the plurality of products; and steps (c) and (d) are carried out by a control unit, which communicates with the detection unit and the transfer device.

To make possible the greatest possible degree of flexibility with respect to providing the products in the pick-up area and placing the products in the placement area, the transfer device preferably has freedom of movement in at least one plane. This plane is preferably oriented horizontally.

It is preferred that the plurality of products be provided in step (a) in a plane and in a single layer; that is, the products should not lie on top of each other or partially cover each other.

The products which are randomly arranged in at least one direction are at different distances from each other in this direction, i.e., are in undefined positions relative to each other.

For example, the products in the pick-up area can be provided in a plane, preferably on a transport device, and are randomly distributed in this plane. The transport device, however, can also comprise guide means, such as parallel (vibrating) channels. The products will then be arranged at uniform distances from each other in a direction transverse to the guide means, but will be nonuniformly arranged in the longitudinal direction of the guide means and thus randomly distributed in the longitudinal direction of the guide means.

Step (b) can comprise detecting the position of each product in the pick-up area. If the plurality of products are stationary between the time their position is determined according to step (b) and the time they are picked up according to step (f), the detected position of each products in the pick-up area corresponds to the associated pick-up position, as a result of which the method becomes especially easy to implement.

Determining the position of each product according to step (b) can, however, also comprise detecting the position of each product while taking into account a movement of each product in a transport direction after the position has been detected. When the movement of each product in the transport direction is taken into account this preferably also comprises determining the transport speed of the products in the transport direction. If the movement of the products is taken into account, the detecting of the position of each product is substantially independent, with respect to time and space, of the pick-up area or of the receptacle, and it is not necessary for the products or the transport device to stand still during the intermediate period. Detecting the position can, for example, be carried out upstream of the pickup area, as a result of which more time is available for steps (c)-(f). If more products are arranged in the pick-up area than can be picked up at once by the transfer device, i.e., if the number of products in the pick-up area is therefore greater than the plurality of pick-up heads of the transfer device, it is also possible to take into account a movement of the products between the picking-up of a first batch of products by the transfer device and the picking-up of a following batch of products by the transfer device in the pick-up area.

Detecting the position of each product preferably comprises assigning and storing the coordinates of each product. In addition, the time at which the position of each product is detected is preferably also stored.

Step (c) preferably comprises assigning an individual pick-up head to an individual product on the basis of the determined position of the product and the arrangement of the plurality of pick-up heads relative to each other. For this purpose, a subquantity of products can be selected from the plurality of products, namely, a subquantity which is the most similar to the arrangement of the plurality of pick-up heads, i.e., which differs as little as possible from that arrangement. As a result, it is possible to obtain the shortest possible pick-up path, and steps (e) and (f) can be carried out quickly. In general, the course of the pick-up path is thus optimized, as a result of which the most uniform possible and shortest possible path is obtained.

Assigning an individual pick-up head to an individual product can be achieved by the control unit on the basis of a mathematical operation. In particular, the use of mathematical operations from the field of image processing are conceivable. For example, assigning can be accomplished by folding of image data, such as the detected positions of the products, onto the arrangement of the plurality of pick-up heads relative to each other.

Step (d) preferably comprises determining the pick-up path on the basis of the determined pick-up positions and pick-up times. Determining the pick-up path can be accomplished by acquiring or calculating the pick-up path on the basis of the determined pick-up positions and pick-up times. The pick-up path is then to be determined in such a way that each pick-up head is located at the corresponding pick-up position at the appropriate pick-up time.

Steps (c) and (d) can also comprise optimizing the pick-up positions and pick-up times and thus optimizing the pick-up path in such a way that the pick-up path between the picking-up of a first product and the picking-up of a last product is as short as possible.

Determining the pickup path according to step (d) can, however, also comprise selecting or calling-up a predetermined pick-up path. This is the case when, for example, the plurality of products in the pick-up area are arranged in a plurality of rows in, for example, (vibrating) channels, and the pick-up heads of the transfer device are also arranged in a corresponding number of rows, so that the transfer device can be moved over the pick-up area in such a way that the rows of products are parallel to the rows of pick-up heads. Because the products are nevertheless randomly distributed at least in the longitudinal direction of the grooves, it is still necessary to determine, for each product, a corresponding pick-up position and a corresponding pick-up time according to step (c).

In a modification of this exemplary embodiment, the number of parallel grooves can also be greater than the number of rows of pick-up heads, preferably corresponding to an even multiple of this number. A predetermined pick-up path for a first batch of products picked up by the transfer device then differs from a predetermined picking path for a succeeding, second batch of products picked up by the transfer device. In particular, these paths are then offset transversely to the longitudinal direction of the grooves. An appropriate pick-up path is therefore to be selected for each transfer process.

In an especially preferred embodiment, the method also comprises the following steps:

determining the state of each product of the plurality of products prior to step (c);

continuing with step (c) only for those products which are in a predetermined state and are classified as "good" products; and sorting out products which are not in the predetermined state and are not classified as "good" products.

Quality control can thus be realized in an especially simple manner. Determining the state of a product can comprise determining one or more quality features. Prior to step (c), therefore, the quality of each product is tested on the basis of at least one quality feature, and only products of adequate quality are then transferred and placed into the receptacles. Products of insufficient quality are not even picked up by the transfer device in the first place and are therefore automatically sorted out.

In particular, step (d) comprises for this purpose not only detecting the position but also detecting an image or image data of the products; and determining of the state of each product comprises the evaluation of the previously detected images or image data. As a result, it can be determined whether or not the state of the products corresponds to a predetermined state or to a predetermined quality. Determining of the state of each product preferably also comprises assigning a state (for example, "good" or "not good") to each product and possibly storing this state.

For the quality testing on the basis of image data, it is possible, for example, to test the shape, the size, or the color of the products as quality features.

According to step (c), only products which have sufficient quality are picked up by the transfer device and transferred. Products which are not of sufficient quality can, in an additional step of the method, be sorted out in that, for example, they are moved out of the pick-up area.

Thus, by means of the same means, it is possible to determine both the position and the state or quality of each product, as a result of which an especially simple method and an especially simple device can be obtained. Nor are any additional means required to sort out the defective products.

Step (b) preferably comprises detecting the orientation of the products. This is advantageous in the case of products which, when viewed from above, have an elongated or elliptical shape, because these are usually to be placed in correspondingly shaped receptacles and thus must be aligned with the receptacles. Such products, when viewed from above, are not arranged in a rotationally symmetric manner in the pick-up area but instead extend farther in the longitudinal direction of the product in question than in its transverse direction.

Step (h), in that case, can also comprise rotating the transfer device or the pick-up head in question in such a way that the product to be placed at the time in question is aligned with the associated receptacle.

In addition or alternatively, steps (e) and (f) can also comprise rotating the transfer device or the pick-up head in question in such a way that all of the products picked up by the transfer device are substantially parallel to each other and can thus be easily placed into the receptacles in the placement area.

Although the products can have any possible orientation when provided in the pick-up area and do not have to be aligned in advance, they can in this way be placed in the receptacles with the correct alignment.

Detecting the orientation of the products is preferably also accomplished in step (b) and even more preferably by the same means as that used to determine the position of the products, in particular by an appropriate detection unit and subsequent image processing.

The plurality of receptacles for the conveyed products are provided in the placement area. The receptacles are usually arranged in predefined patterns. For example, the receptacles are formed by the blister pockets of a blister web, from which blister packs are stamped out afterwards. Each blister pack comprises a pattern of blister pockets, which repeats at least in the conveying direction and optionally also transversely to the conveying direction of the blister web. Receptacles of a different shape, such as individual containers or containers with individual compartments, can also be provided, wherein preferably one container or one compartment is provided for each product.

The plurality of receptacles in the placement area can be stationary during step (h), i.e., substantially unmoving, or they can move in a conveying direction. If the receptacles in the placement area are standing still, the transfer device moves over the receptacles along the placement path as appropriate. If the receptacles are moving in the conveying direction, however, the relative movement between the receptacles and the transfer device must be taken into account when determining the placement path, i.e., the placement path will comprise this relative movement.

In one embodiment, the placement path can be predetermined. This is possible when the positions of the pick-up heads and the pattern of the receptacles in the placement area are predetermined. In addition, the speed of the receptacles in the placement area must be known, or the receptacles must be standing still at the time the products are placed.

The method can therefore comprise, prior to step (h), determining the placement path by selecting a predetermined placement path. The placement path is preferably established on the basis of the arrangement of the pick-up heads relative to each other and on the arrangement of the receptacles relative to each other.

It is also possible, however, for the method to comprise, prior to step (h), determining the placement path by calculating the placement path. This can be the case, for example, when the receptacles are randomly arranged in the placement area or the method is used for post-filling or evening out and only certain individual receptacles are to be filled with products.

Calculating the placement path preferably comprises assigning an individual pick-up head to an individual receptacle on the basis of the arrangement of the plurality of pick-up heads relative to each other and the arrangement of the plurality of receptacles relative to each other, and calculating the placement path on the basis of this assignment.

The method can also comprise determining a placing position where, and a placing time when, the individual pick-up head places a product, this being done for each pick-up head of the plurality of pick-up heads, on the basis of the arrangement of the plurality of pick-up heads relative to each other and the positions of the receptacles in the placement area to be filled.

It is especially preferred that the receptacles be moved in a plane in a conveying direction at least before and after step (h), optionally also during step (h). The receptacles are preferably arranged in rows and columns, which extend in this plane parallel to the conveying direction and perpendicular to the conveying direction. Step (h) then comprises moving the transfer device in a first direction perpendicular to the conveying direction, moving the transfer device relative to the receptacles parallel to the conveying direction, and moving the transfer device in a second direction perpendicular to the conveying direction and opposite to the first direction. Products are placed in the receptacles during each of these movements of the transfer device in the first and second directions. Preferably no products are placed during the relative movement parallel to the conveying direction.

In a preferred embodiment, the plurality of products in the pick-up area, preferably also the plurality of receptacles in the placement area, are arranged in a plane. Step (f) then comprises moving the individual pick-up head relative to the other pick-up heads in a direction perpendicular to this plane and actuating this pick-up head. Step (h) comprises moving the individual pick-up head relative to the other pick-up heads in a direction perpendicular to this plane and deactivating of this pick-up head. As a result, the individual pick-up head which has just picked up a product or just placed it can be moved in the direction of the product or in the direction of the receptacle and can thus reliably pick or place the product without colliding with other pick-up heads with products or with receptacles.

It is especially preferred in step (f) that the products be picked up one after the other, which is supported by the possibility of moving and activating each of the pick-up heads independently.

Activating a pick-up head corresponds to an actuation of the pick-up head in such a way that it grips a product. Deactivating the pick-up head corresponds to an actuation of the pick-up head in such a way that it releases a product.

If a pick-up head is configured as a suction device, for example, the activation of the pick-up head corresponds to the generation of a negative pressure or vacuum and thus of a suction effect acting on the product. Deactivation corresponds to the ending of the negative pressure or vacuum and thus of the suction force. If desired, a positive pressure can be generated to support the release.

If a pick-up head is formed by a gripper, the activation of the pick-up head corresponds to the closing of the gripper or the moving of the gripper in such a way that it grasps a product, and the deactivation of the pick-up head corresponds to the opening of the gripper or the moving of the gripper in such a way that it releases the product.

In step (h), the products are preferably placed one after the other by deactivation of the associated pick-up head while the transfer device is being moved along the placement path, so that the placing according to step (h) also occurs substantially independently of the format or of the arrangement of the receptacles in the placement area.

Step (h) preferably comprises moving the transfer device along a placement path relative to the plurality of receptacles in the placement area.

The placement path can be determined prior to step (h) by:
assigning each pick-up head to an individual receptacle on the basis of the arrangement of the plurality of pick-up heads relative to each other and to the arrangement of the plurality of receptacles relative to each other, and determining the placement path on the basis of this assignment, or
selecting a predetermined placement path.

In a preferred embodiment, the plurality of receptacles in the placement area are arranged in a plane, and step (h) comprises moving each of the pick-up heads relative to the other pick-up heads in a direction perpendicular to the plane and deactivating this pick-up head.

A transfer assembly according to the disclosure for transferring products may comprise a transport device for transporting a plurality of separate, randomly arranged products to a pick-up area, a conveyor device for conveying a plurality of receptacles from a placement area, and a transfer device, which can be moved between the transport device and the conveying device to transfer products from the pick-up area to the placement area. The transfer device comprises a plurality of pick-up heads, each of which picks up a single product. Each pick-up head is movable in a first direction relative to, and independently of, the other pick-up heads of the plurality of pick-up heads, this first direction being perpendicular to the plane in which the plurality of products are arranged in the pick-up area. Each pick-up head, furthermore, can be activated and deactivated independently of the other pick-up heads of the plurality of pick-up heads.

Thus a transfer assembly is provided, in which products are provided as bulk goods in a random arrangement and which nevertheless makes it possible to place the products individually into corresponding receptacles in an efficient manner. There is no absolute need to sort, align, or separate the products beforehand, as a result of which the transfer assembly has a simple configuration. No easily contaminated assemblies are required, as a result of which the amount of cleaning work is reduced. Because the pick-up heads can be actuated individually, the products can be picked up and placed by the pick-up heads in any position while the transfer device is moving or standing still. This means, first, that the fastest possible picking can be carried out no matter how the products in the pick-up area are arranged at any particular time; and, second, placing is substantially independent of the format of the products and of the receptacles. In particular, the arrangement of the plurality of pick-up heads relative to each other and the arrangement of the plurality of receptacles relative to each other have substantially no effect on each other. The transfer device can therefore be configured, for example, independently of the number and arrangement of receptacles in the form of blister pockets of a blister web.

The method according to the disclosure is preferably implemented by a transfer assembly according to the disclosure. In particular, the freely movable transfer device with the individually activatable and deactivatable pick-up heads makes it possible to place randomly arranged products in the receptacles provided for them in the most efficient possible way. All of the features described in conjunction with the method according to the disclosure are therefore transferable analogously to the transfer assembly according to the disclosure and vice versa.

The pick-up area is preferably formed on the surface of the transport device. The transport device is configured to move the products in a transport direction. The transport device is preferably formed by a transport belt, on which the products can be arbitrarily arranged as bulk goods. The transport device can also be formed by shaking/vibrating channels, which are parallel to each other and extend in the transport direction. In this case, the products are arranged at a predefined distance from each other in the direction transverse to the transport direction, this distance being the distance between the channels. Nevertheless, they can be at different distances from each other in the transport direction and will thus be arranged randomly at least in this direction.

The placement area is preferably formed on the surface of the conveying device. The conveying device is configured to move the receptacles in a conveying direction. The conveying device can also serve to convey the plurality of receptacles into the placement area. The receptacles can, for example, be formed by the blister pockets of a blister web, and the conveying device will then comprise the blister web and conveying means for conveying the blister web in the conveying direction. The conveying device, however, can also comprise, for example, a conveyor belt, on which appropriate containers are provided as receptacles. The conveying direction is preferably parallel to the transport direction of the transport device.

The products are preferably solid pharmaceutical items such as sugar-coated pills or tablets.

In a preferred embodiment, the transfer assembly also comprises a detection unit for detecting the plurality of products and a control unit, which communicates with the detection unit, with the transfer device, and with the plurality of pick-up heads.

The detection unit is configured to provide the control unit with data on the position of each product of the plurality of products. The control unit is configured to actuate the transfer device and the plurality of pick-up heads as a function of the data provided by the detection unit. As a result, the positions of the randomly arranged products can be detected, and the picking of the products by the pick-up heads can be actuated efficiently.

The detection unit is preferably an optical sensor such as a camera or a light barrier. The detection unit is preferably mounted above a plane of the transport device. The detection unit can be arranged upstream, relative to the transport direction, of the pick-up area, wherein, in that case, the movement of the products between the time at which their positions are detected and the time at which they are picked up in the pick-up area must be taken into account in the determination of the positions of the products in the pick-up area. The detection unit, however, could also be aimed directly at the pick-up area and would thus possibly detect the plurality of products in their final positions before they are picked up.

The control unit preferably also communicates with the conveying device and/or with the transport device to receive data on the movement of the products in the transport direction and/or of the receptacles in the conveying direction and to take such data into account.

The control unit is configured to determine the pick-up position and the pick-up time for each pick-up head. It controls the movement of the transfer device along the pick-up path and the placement path, the movement of each pick-up head in the first direction, and the activation or deactivation of each pick-up head.

The control unit is preferably configured to actuate the transfer device in such a way that it executes steps (e), (g), and (h) of the method according to the disclosure. In addition, the control unit can be configured to actuate each pick-up head in such a way that it executes step (f).

The control unit is preferably a programmable logic controller (PLC).

The detection unit can also be configured to detect additional features of the products such as their shape, orientation, or color. The detection unit can also detect the state of the products or quality features of the products indicative of their state, as described above.

In correspondence with what has been described above, the pick-up heads can be formed by, for example, suction units.

In a preferred embodiment, each pick-up head is formed by a suction unit, which comprises a suction element for pulling in and picking up a product, a first actuator for moving the suction element in the first direction, and a second actuator for individually activating and deactivating the suction unit. Pick-up heads of this type have a relatively simple structure and can also be operated reliably.

The suction element is in particular a suction head, which forms a receptacle for a product and is connected to a suction line. The first actuator can be an actuating drive for moving the suction element in the first direction. The second actuator can activate and deactivate the suction force of the suction unit in that it, for example, connects a suction line of the suction unit to a vacuum source or negative pressure source or in that it generates a negative pressure itself. The second actuator is configured as, for example, a valve.

The first and second actuators can also be configured as an integral unit. This can be the case when, for example, a movement of the suction element in the first direction simultaneously makes or breaks a connection with a suction line.

The negative pressure is preferably generated by way of a venturi nozzle directly on the suction element.

The transfer device can be given an especially simple configuration by fixing the pick-up heads in position, relative to each other, in a plane perpendicular to the first direction.

In one embodiment, however, it is also possible for the arrangement of the pick-up heads, relative to each other on the transfer device, to be adjustable. For example, the spacing of the pick-up heads in a plane perpendicular to the first direction can be adjustable in order to set the spread of the pick-up heads. As a result, the transfer device can also be adapted, even without the movement of the transfer device, to different formats of receptacles or assemblies of receptacles in the placement area relative to each other.

DETAILED DESCRIPTION

Figure 1:
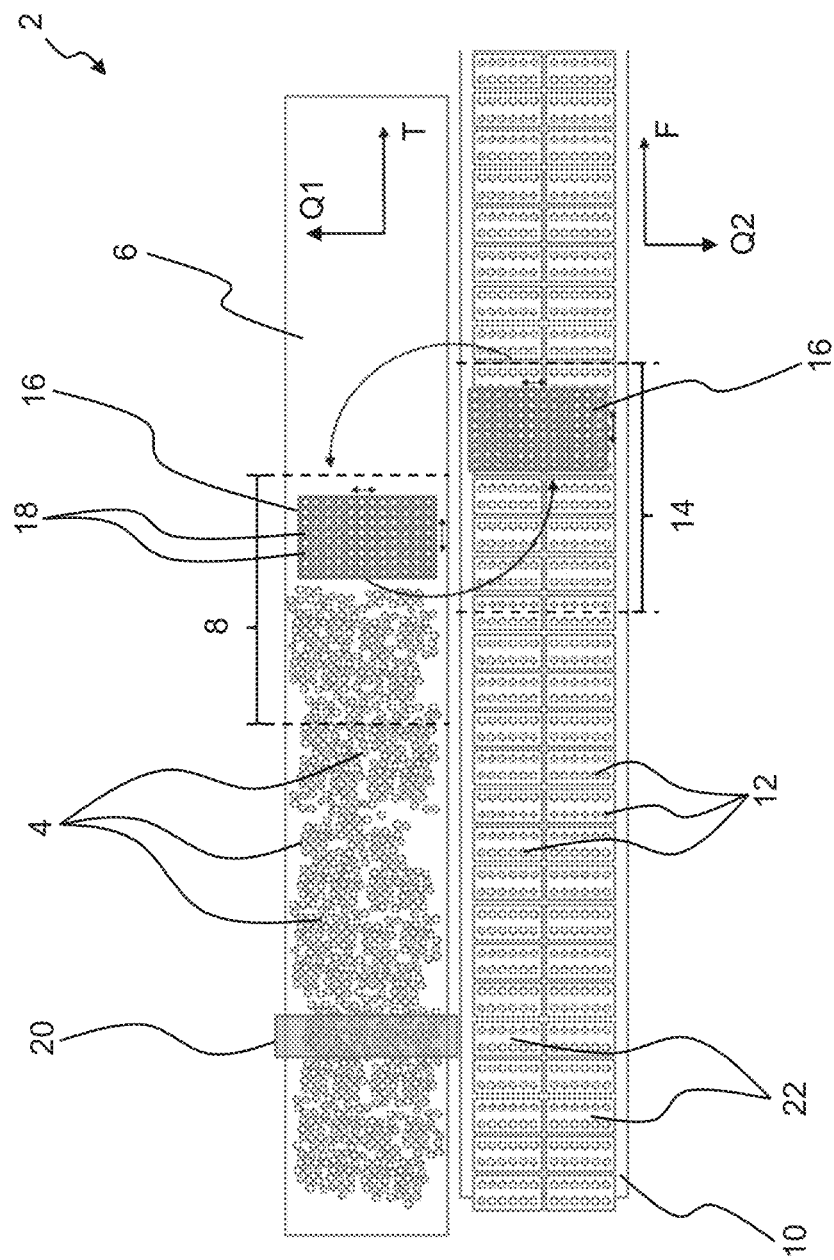
FIG. 1 is a top view of a first embodiment of a transfer assembly according to the disclosure.

FIG. 1 shows a schematic top view of a transfer assembly 2 according to the disclosure. The transfer assembly 2 for transferring and loading products 4 into appropriate receptacles comprises a transport device 6, which conveys a plurality of separate, randomly arranged products 4 in a transport direction T to a pick-up area 8, and a conveying device 10, which conveys a plurality of receptacles 12 in conveying direction F from a placement area 14. The transfer assembly 2 also comprises a transfer device 16, which transfers the products from the pick-up area 8 to the placement area 14 and which for this purpose can be moved between the transport device 6 and the conveying device 10.

For the sake of better illustration, the transfer device 16 in FIG. 1 is shown in a first position above the pick-up area 8 and in a second position above the placement area 14. Movement between the first and the second positions is indicated by curved arrows. It is also conceivable that the transfer assembly 2 could comprise two or more transfer devices 16, which would have to be moved past each another as needed. The transfer device 16 comprises a plurality of pick-up heads 18, each of which picks up a product 4. These units are merely indicated in FIGS. 1 and 2, but are illustrated in detail in FIG. 3.

The transfer assembly 2 also comprises a detection unit 20, which detects the position of each product 4 of the plurality of products 4. A control unit (not shown) is also provided, which communicates with the detection unit 20 and with the transfer device 16 and which preferably also communicates with the transport device 6 and the conveying device 10.

The transport device 6, in the embodiment shown here, is configured as a transport belt, but it could also be formed by other means familiar to the skilled person such as shaking or vibrating channels. On the transport device 6, the products 4 are arranged in a plane and are randomly distributed at least in one direction. The products 4 here are randomly arranged both in the transport direction T and in a first transverse direction Q1, which is perpendicular to the transport direction T and parallel to the plane of the transport device 6. The products 4 are therefore at different arbitrary distances from each other both in the transport direction T and in the first transverse direction Q1. If, however, the transport device 6 comprises channels extending in the transport direction T, the products 4 are then at a defined distances from each other in the first transverse direction Q1, whereas the products 4 are at arbitrary, different distances from each other in the transport direction T.

The detection unit 20 is indicated here schematically; it is located upstream, with respect to the transport direction T, from the pick-up area 8. The detection unit 20 detects at least the position of each product 4 and, if desired, it can also detect additional product features such as the shape, orientation, color, or state of the products 4.

If the detection unit 20 is located upstream of the pick-up area 8 as illustrated here, the control unit calculates a position of the products 4 in the pick-up area 8 on the basis of the position of the products 4 detected by the detection unit 20 and also on the basis of the speed at which the products are being transported in the transport direction T by the transport device 6.

It is also conceivable, however, that the detection unit 20 could be aimed directly at the pick-up area 8 and detect the position of each product 4 in the pick-up area 8. If the products are not moved between the time their position is detected and the time they are picked up by the transfer device 16, there is no need to take into account a movement in the transport direction; otherwise, the procedure already described above is to be used.

To pick up the products 4, the transfer device 16 is movable relative to the transport device 6 or the pick-up area 8 at least in the transport direction T. In particular, when the products 4 are also randomly arranged in the first transverse direction Q1, the transfer device 16 is preferably movable also in the first transverse direction Q1 relative to the transport device 6 or the pick-up area 8. In the pick-up area 8, the transfer device 16 preferably has the greatest possible freedom of movement parallel to the plane of the transport device 6.

If the detection unit 20 detects the state of the products 4 or quality features of the products 4, the transfer device 16 can be actuated in such a way that it picks up only those products which are in a predetermined state or which have sufficient quality. Products 4 which are not in the predetermined state or which are of insufficient quality then remain on the transport device 6. The transport device 6 moves such products 4 onward in the transport direction T and out of the pick-up area 8, whereupon they can be sent on for destruction and disposal.

The conveying device 10 can comprise a blister web, which consists of a molded film, in which a plurality of blister pockets are formed as receptacles 12. After the pockets have been filled with products 4 by the transfer device 16 and a lidding film has then been sealed onto the blister web, individual blister packs are stamped out of a blister web of this type; these blister packs are indicated in FIG. 1 for the sake of illustration and provided with the reference number 22. It is also conceivable, however, that the conveying device 10 could be configured as a conveyor belt, on which appropriate containers 22 with receptacles 12 are arranged. For example, each receptacle 12 could form a compartment of a tablet container 22.

The conveying device 10 provides the receptacles 12 in the placement area 14, where they are filled with products 4 by the transfer device 16. The conveying device 10 moves the receptacles 12 in the conveying direction F, which is preferably parallel to the transport direction T. As illustrated, the conveying device 10 can move the receptacles 12 both into the placement area 14 and also out of the placement area 14. The receptacles 12 are preferably arranged in a predetermined pattern relative to each other. In the placement area 14, the transfer device 16 is preferably movable relative to the receptacles 12 or the conveying device 10 in the conveying direction F and/or in a second transverse direction Q2, which is perpendicular to the conveying direction F and parallel to the plane of the conveying device 10 in the placement area 14. The transfer device 16 preferably has freedom of movement parallel to this plane.

Figure 2:
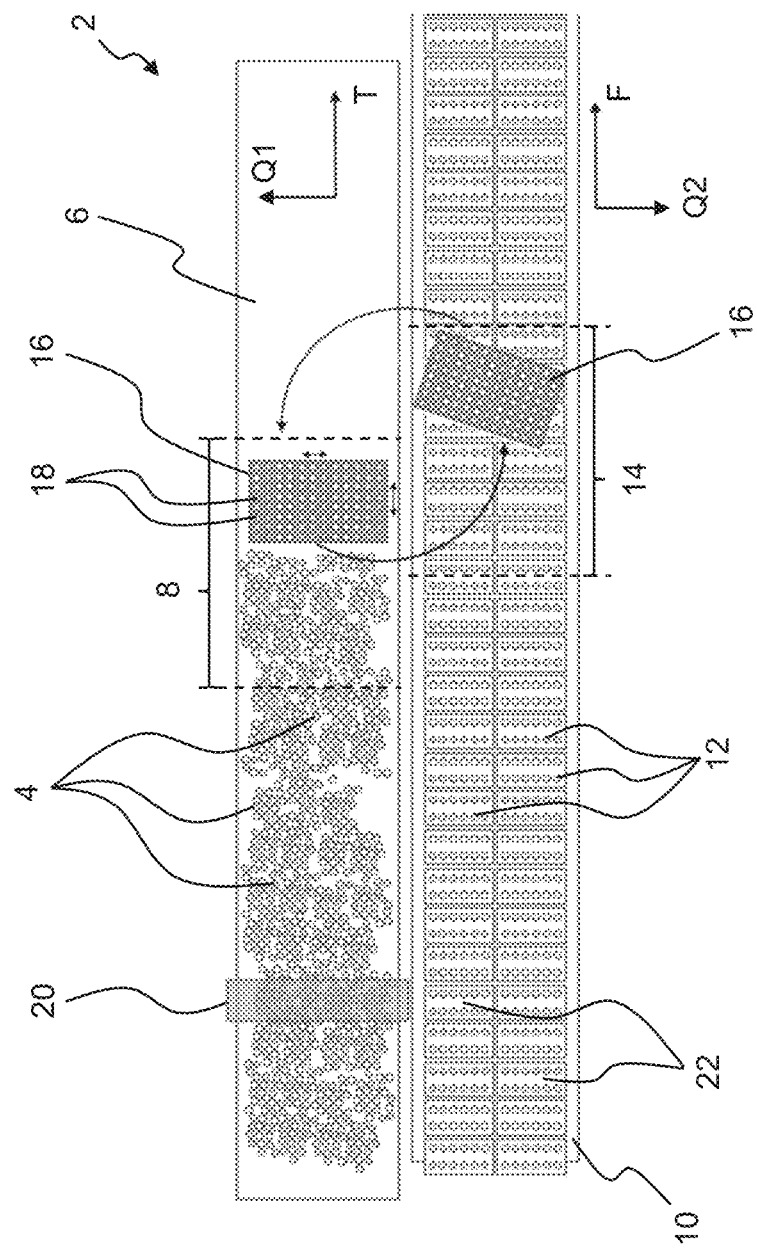
FIG. 2 is a top view of a second embodiment of a transfer assembly according to the disclosure.

As can be seen in FIG. 2, the transfer device 16 can also be rotated around an axis perpendicular to the plane of the transport device 6 in the pick-up area 8 or of the conveying device 10 in the placement area 14. As an alternative to the rotation of the entire transfer device 16, each pick-up head 18 of the plurality of pick-up heads 18 could also be configured rotatably. In the case of products which are not rotationally symmetric to such an axis, this rotatability offers the advantage that the products 4 can be placed in such a way that that they are aligned with the receptacle 12 in question despite their arbitrary orientation in the pick-up area 8.

In addition, the rotation of the transfer device of this type results in a change in the spacing between the pick-up heads 18 in a direction parallel to the first transverse direction Q1 or the second transverse direction Q2, which means that it is possible to adapt them to the arrangement of the products in the pick-up area 8 or to an arrangement of the receptacles 12 in the placement area 14. Otherwise the embodiment according to FIG. 2 corresponds to the embodiment of FIG. 1, and reference can be made in this regard to the earlier description.

Figure 3:
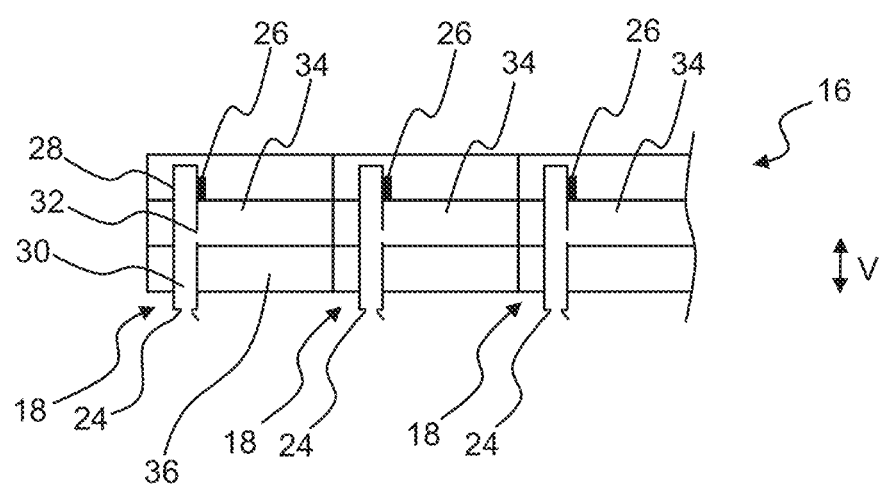
FIG. 3 shows a schematic, cross-sectional view of a transfer device of the transfer assembly according to the present disclosure.

FIG. 3 shows a schematic cross-sectional view of the transfer device 16. The transfer device 16 comprises a plurality of pick-up heads 18, three of these pick-up heads 18 being shown here. Each pick-up head 18 is movable relative to, and independently of, the other pick-up heads 18 parallel to a first direction V, which is perpendicular to the plane of the transport device 6 in the pick-up area 8 or of the conveying device 10 in the placement area 14. Each pick-up head 18, furthermore, can be activated and deactivated independently of the other pick-up heads 18.

In the preferred embodiment shown here, each pick-up head 18 is configured as a suction unit and comprises a suction element 24 for pulling in and picking up a single product 4. Each suction element 24 comprises a suction cup, which is indicated here as a funnel and which can be adapted to the shape of the products 4 to be transferred. Each suction unit 18 also comprises a first actuator 26 for moving the suction unit 24 in the first direction V. The first actuator 26 can be, for example, an electrical, magnetic, pneumatic, hydraulic, or mechanical actuating drive.

Each suction unit 18, furthermore, comprises a second actuator (not shown) for individually activating and deactivating the suction unit 18; this second actuator can be configured as, for example, a valve or as a source of negative pressure or vacuum. Each suction unit 18 can for this purpose comprise a cylindrical pin 28 with a bore 30, wherein the bore 30 leads to the end of the pin 28 provided with the suction element 24. In addition, the other end of the pin 28 or a lateral surface of the pin 28 can have an opening 32, which creates a fluid connection between a negative pressure line 34 of the transfer device 16 and the bore 30 and thus between the suction unit 24 and the negative pressure line 34.

In addition, the transfer device 16 can comprise a positive pressure line 36 to supply the suction unit 24 via the bore 30 and the opening 32 or some other opening with positive pressure, as a result of which the placing of the products 4 by the suction unit 24 is supported, and contamination of the suction unit 24 is avoided.

The lines 34, 36 can be configured in the body of the transfer device 16 or as separate lines in the form of, for example, hoses, which are connected to the individual pick-up heads 18.

Each pick-up head 18 can be activated or deactivated by individual actuation of a valve connected to the lines 34, 36 between the pick-up head 18 and a source of negative or positive pressure. Alternatively, the movement of the pick-up head 18 in the first direction V can make or break the connection of the suction unit 24 with the associated line 34, as indicated in FIG. 3.

An embodiment of the method according to the disclosure is described below with reference to FIGS. 1 and 2. The method according to the disclosure is basically independent of the detailed features or configurations of the transfer assembly 2, but it is advantageous for the method to be implemented by it.

First, a plurality of products 4 is provided in the pick-up area 8, wherein the products 4 are randomly arranged. The providing of the plurality of products 4 is preferably achieved by means of the transport device 6, on which the products 4 are arranged as bulk goods and are different distances apart at least in the transport direction T of the transport device 6.

The position of each product 4 of the plurality of products 4 in the pick-up area 8 is then determined. For this purpose, the detection unit 20 can detect the position of each product 4, and a control unit of the transfer assembly 2 can then, on the basis of the detected position of each product and the transport speed of the products 4 on the transport device 6, calculate the position of each product 4 in the pick-up area 8.

The detection unit 20, however, can also be aimed directly at the pick-up area 8 to detect the position of each product 4 in the pick-up area 8.

The control unit now determines, for each pick-up head 18 of the transfer device 16, a pick-up position where, and a pick-up time when, the pick-up head 18 in question picks up a product 4. This determination is made on the basis of the arrangement of the plurality of pick-up heads 18 relative to each other and the previously determined position of the products 4 in the pick-up area 8.

After that, a pick-up path for the transfer device 16 is determined; it is along this path that the transfer device 16 will move relative to the plurality of products 4 arranged in the pick-up area 8. The pick-up path is preferably calculated on the basis of the determined pick-up positions and pick-up times. If the products 4 in the pick-up area 8 are provided at uniform distances from each other at least in the first transverse direction Q1, in, for example, shaking or vibrating channels, and if these distances correspond to the distances between the pick-up heads 18 of the transfer device 16, the pick-up path of the transfer device 16 can also be predetermined. In that case, there remains only the need to determine the pick-up positions and pick-up times and to activate the pick-up heads 18 correspondingly.

During the movement of the transfer device 16 along the pick-up path, each pick-up head 18 picks up a product 4 in the individually determined pick-up position and at the individually determined pick-up time. Because the transfer device 16 is moved over the products 4 during the picking-up process, the transfer device 16 and its pick-up heads 18 can be stocked as desired with products 4 independently of the arrangement of the plurality of products 4 in the pick-up area 8. The pick-up path can be adapted in each cycle to the arrangement of products at the time in question in the pick-up area 8.

Once the transfer device 16 has been stocked as desired, it is moved to the placement area 14, in which the plurality of receptacles 12 for the products 4 are provided.

In the placement area, the transfer device 16 is moved relative to the plurality of receptacles 12 along a placement path, during which an individual product 4 is placed in a receptacle 12 by each pick-up unit 18. Because the receptacles 12 are preferably arranged in predetermined patterns relative to each other, the placement path of the transfer device 16 can be predetermined.

To achieve format independence, the transfer device 16 is preferably moved over the receptacles 12, wherein, in each case, a pick-up head 18 places a product 4 in a receptacle 12, once these are aligned with each other. The method can be used when none of the receptacles 12 have previously been filled with a product 4 and all of the receptacles 12 are to be filled by the transfer device 16. But the method can also be used for post-filling, when some of the receptacles 12 have already been filled with products 4 but certain other receptacles 12 have not yet been filled or will not be filled with products 4.

If the spacing and the orientation of the pick-up heads 18 in the second transverse direction Q2 corresponds to the spacing and the orientation of the receptacles 12, it is also conceivable that the transfer device 16 could substantially stand still in the placement area 14, and that the receptacles 12 could be moved through in the conveying direction F under the transfer device 12.

Additional embodiments within the scope of the disclosure will be evident to the skilled person on the basis of the exemplary embodiments described here. The method according to the disclosure and the assembly according to the disclosure offer a high degree of flexibility in the picking and placing of products such as tablets. As a result, the method and the assembly can be used in a wide variety of applications and can also have the simplest possible configuration.

The invention claimed is:

1. A method for loading products into receptacles by means of a transfer device, which has a plurality of pick-up heads, wherein each of the plurality of pick-up heads picks up an individual product, the method comprising the steps of:
   (a) providing a plurality of products in a pick-up area, wherein the products are randomly arranged in at least one direction;
   (b) determining a position of each product of the plurality of products in the pick-up area;
   (c) determining, for each pick-up head of the plurality of pick-up heads, a pick-up position where each pick-up head of the plurality of pick-up heads picks up a product, and a pick-up time when each pick-up head of the plurality of pick-up heads picks up a product, based on the arrangement of the plurality of pick-up heads relative to each other and based on the determined position of each product of the plurality of products in the pick-up area;

(d) determining a pick-up path of the transfer device along the determined pick-up positions and in accordance with the determined pick-up times of each pick-up head;

(e) moving the transfer device along the pick-up path relative to the plurality of products arranged in the pick-up area;

(f) picking up an individual product by each pick-up head in each of the determined pick-up positions and at each of the determined pick-up times during moving the transfer device along the pick-up path;

(g) moving the loaded transfer device to a placement area, where a plurality of receptacles for the moved products are provided; and (h) placing each individual product in a receptacle by the use of the pick-up heads;

wherein the method further comprises the steps of:

determining a state of each product of the plurality of products by determining one or more quality features of each product prior to step (c);

continuing with step (c) only for those products which are in a predetermined state corresponding to a predetermined quality; and sorting out products which are not in the predetermined state.

2. The method according to claim 1, wherein step (b) comprises detecting the position of each product in the pick-up area.

3. The method according to claim 1, wherein step (b) comprises detecting the position of each product while taking into account the movement of each product in the transport direction after each position has been detected.

4. The method according to claim 1, wherein step (c) comprises assigning an individual pick-up head to an individual product based on the determined position of the products and the arrangement of the plurality of pick-up heads relative to each other.

5. The method according to claim 4, wherein assigning an individual pick-up head to an individual product is carried out by the control unit by the use of a mathematical operation.

6. The method according to claim 1, wherein step (d) comprises determining the pick-up path based on the determined pick-up positions and pick-up times, or the selection of a predetermined pick-up path.

7. The method according to claim 6, with reference to the first alternative, wherein steps (c) and (d) comprise optimizing the pick-up positions and pick-up times and thus of the pick-up path, so that the pick-up path between the picking-up of a first product and the picking-up of a last product is as short as possible.

8. The method according to claim 1, wherein step (b) also comprises detecting an orientation of the products; and step (e) or step (f) also comprises rotating the transfer device or at least one of the pick-up heads in such a way that the product to be picked up is aligned with the other products on the transfer device to be transferred; or step (h) also comprises rotating the transfer device or at least one of the pick-up heads in such a way that the product to be placed is aligned with the corresponding receptacle.

9. The method according to claim 1, wherein the plurality of products are arranged in the pick-up area in a plane; and step (f) comprises moving one of the pick-up heads relative to the other pick-up heads in a direction perpendicular to the plane, and activating the one pick-up head.

10. The method according to claim 1, wherein step (h) comprises moving the transfer device along a placement path relative to the plurality of receptacles in the placement area.

11. The method according to claim 10, further comprising, prior to step (h), determining the placement path by:

assigning, in each case, a pick-up head to an individual receptacle based on the arrangement of the plurality of pick-up heads relative to each other and based on the arrangement of the plurality of receptacles relative to each other, and calculating the placement path based on the result of the step of assigning; or selecting a predetermined placement path.

12. The method according to claim 1, wherein the plurality of receptacles in the placement area are arranged in a plane, and step (h) comprises moving one of the pick-up heads relative to the other pick-up heads in a direction perpendicular to the plane, and deactivating the one pick-up head.

* * * * *